United States Patent

[11] 3,603,290

| [72] | Inventor | David B. O'Rork |
| | | 919 Isleta, Santa Barbara, Calif. 93105 |
| [21] | Appl No | 21,249 |
| [22] | Filed | Mar. 20, 1970 |
| [45] | Patented | Sept. 7, 1971 |

[54] PET-OPERATED ANIMAL TOILET
12 Claims, 16 Drawing Figs.

| [52] | U.S. Cl. | 119/1, 119/29, 119/51 |
| [51] | Int. Cl. | A01k 15/00, A01k 05/02 |
| [50] | Field of Search | 119/1, 29, 51 |

[56] References Cited
UNITED STATES PATENTS

| 1,813,329 | 7/1931 | Supplee | 119/1 |
| 2,584,656 | 2/1952 | Anderson | 119/1 |
| 2,796,044 | 6/1957 | Breland | 119/29 |
| 3,227,138 | 1/1966 | Campbell | 119/1 |

Primary Examiner—Aldrich F. Medbery
Attorney—Harry W. Brelsford

ABSTRACT: A pet is trained to excrete upon a tray and to reinforce the training, the pet is given a reward for excreting, such as food from a dispenser operated by the pet. To prevent the pet from cheating, a urine sensor and a feces sensor are located on the tray and an interlock circuit connects them to the dispenser, preventing operation of the dispenser unless at least one of the sensors detects the presence of excrement. To reduce odors, a flushing flow of water may be provided and the human toilet bowl is utilized to receive the animal excrement and the flushing flow. Since water flow is available to the tray, the sensors may be water powered, and the interlock circuit may be water powered.

PATENTED SEP 7 1971 3,603,290

INVENTOR.
DAVID B. O'RORK
BY
H.W. Brelsford
ATTORNEY

PATENTED SEP 7 1971 3,603,290

INVENTOR.
DAVID B. O'RORK
BY H.W. Breleford
ATTORNEY

PATENTED SEP 7 1971 3,603,290
SHEET 5 OF 5
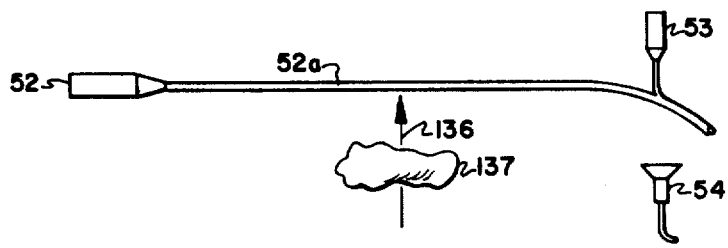
FIG. 12
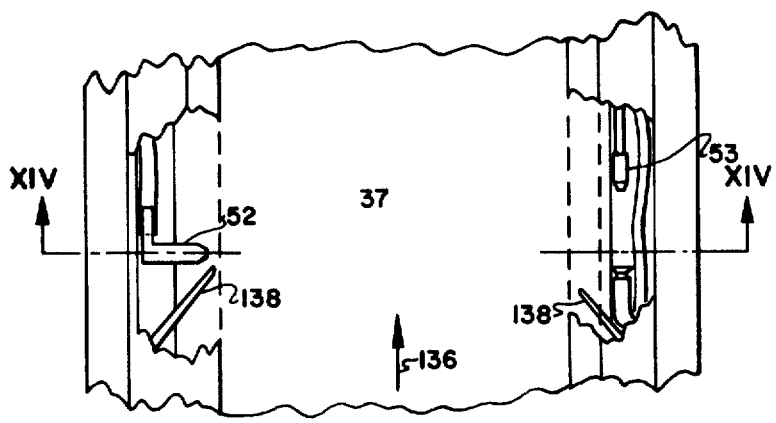
FIG. 13
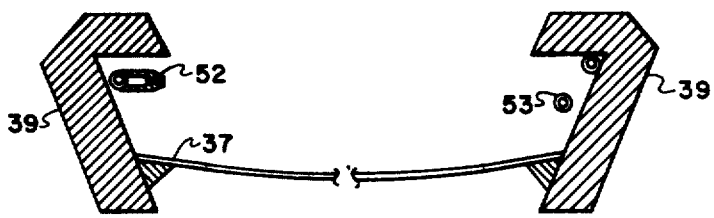
FIG. 14
FIG. 15
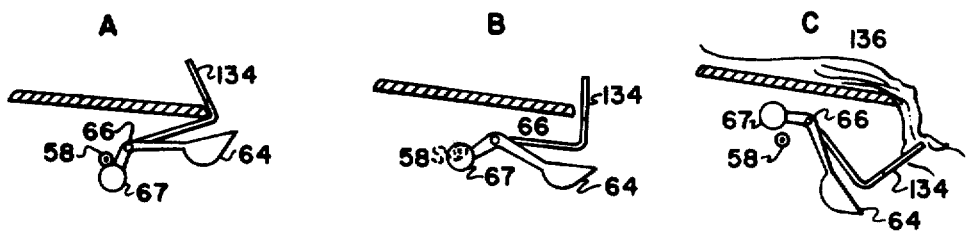
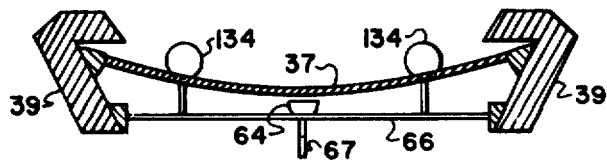
FIG. 16
INVENTOR.
DAVID B. O'RORK
BY H.W. Brelsford
ATTORNEY

PET-OPERATED ANIMAL TOILET

My invention relates to a pet-operated toilet for household pets, such as dogs and cats, which permits pets to relieve themselves when locked in a dwelling, unattended by humans. More particularly, the pet toilet is positioned to deposit pet excrement into the usual toilet bowl of a dwelling normally used by humans.

At the present time a pet is trained to use the yard through a pet door or through a regular door that has to be opened by his master. In most cases the yard is messed up and has to be cleaned. This limits dogs and cats to private homes. With multiple dwellings becoming more popular, the comfort of owning a pet will become a thing of the past for many people, and especially to young boys, and older people who live alone, who will be deprived of the pleasure of having a pet. The value that people place on their pets is evidenced by the number of dollars spent annually on pet supplies.

If a pet can be trained to use a facility in the home, then it would be possible to keep a pet in a multiple dwelling. The present invention fulfills that need. The unit fits over the existing toilet facility and can be moved out of the way to accommodate its regular use. It is placed over the toilet at all times for the convenience of the pet and need only be moved when humans in the home use the facility. The pet can easily be trained to use this device because the unit issues a reward when it has been properly used. It is completely self-contained. The pet activates the device with his paw. The paw switch sets off a sequence of sensing and flushing events. A reward will only be issued if the pet has relieved himself in the proper area. That area is a shelf having a hard surface and has a gradual slope, so that excrement can be flushed into the toilet bowl. The adapter preferably is powered entirely by household water supply, and is connected to the waterpipe that feeds the existing toilet. This connection can be made by a simple tee on the water line that feeds the tank and a plastic pipe connected to the tee supplies the adapter. The only extra upkeep is keeping the reward hopper full of appropriate food.

It is therefore a general object of the invention to provide an improved adapter for household toilets that enables a household pet to excrete and which flushes the excrement into the toilet bowl.

Other objects, advantages and features of the invention will be apparent in the following specification, including the drawings forming an integral part thereof, in which FIG. 1 is a three-dimensional view of a conventional flush toilet for human beings, wherein the tray portion of the pet toilet is positioned over the bowl and is hinged to a floor-supported dispenser cabinet.

FIG. 12 is a schematic plan view of the feces sensor.

FIG. 13 is a plan view of a segment of the tray of FIG. 1, showing the location of the feces sensor parts and components.

FIG. 14 is a sectional view along the line XIV—XIV of FIG. 13.

FIG. 15 is a view of the urine sensing mechanism in three different positions, FIG. A being the normal position, FIG. B being the position when the urine cup is full and the sensing jet is intercepted, and FIG. C showing the dumping of the bowl by the action of the flush water striking a baffle.

Figure 10:
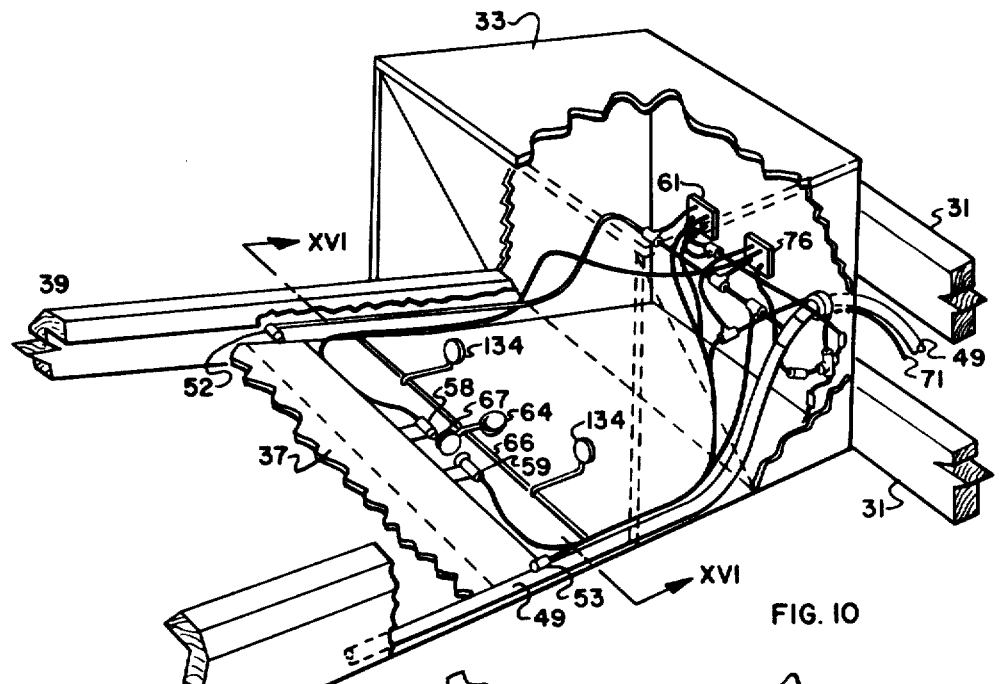
FIG. 10 is a three-dimensional view with parts of the outer cabinet broken away of the portion of the tray directly over the toilet bowl of FIG. 1, showing the urine sensor mechanism and associated fluid switch, as well as the feces sensor and its associated fluid switch.

FIG. 16 is a sectional view along the line XVI—XVI of FIG. 10, showing the baffles of FIG. 15 used to dump the urine cup.

Figure 1:
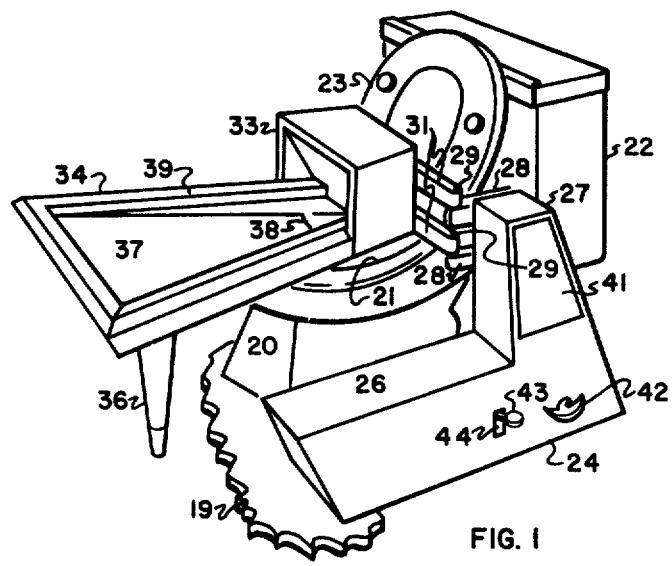
Figure 2:
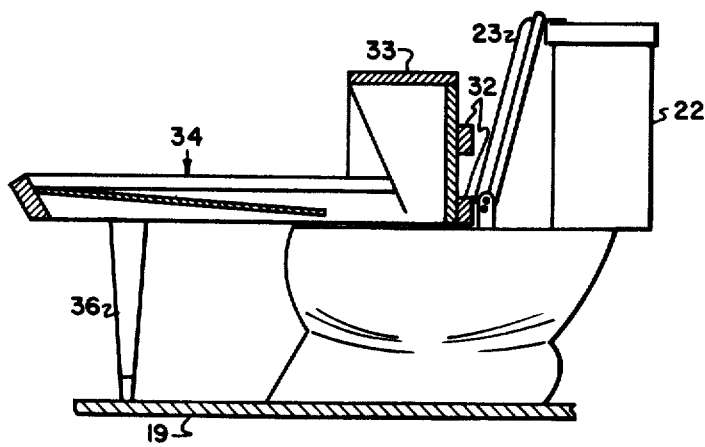
FIG. 2 is a side view of the flush toilet of FIG. 1 with the dispenser cabinet removed, showing the tray with one end positioned over the bowl of the toilet.

Referring to FIGS. 1 and 2, supported on a floor 19 is a household toilet 20 having a toilet bowl 21 which supports a flush tank 22 and a toilet seat 23 hinged back against the flush tank 22. Mounted on the floor 19 is a dispenser cabinet 24 having a step-up portion 26 and a pedestal portion 27. Mounted on the back of the pedestal 27 is a pair of bars 28 connected by hinge pins 29 to a pair of bars 31 secured to the rear of a tray cabinet 33 which also supports one end of a tray 34, the other end of which is supported by a leg 36. The tray 34 has a tray surface 37 which is curved into a trough and has a high end at the left and a low end 38 which ends directly over the toilet bowl 21 so that liquid and solids may drop into the toilet bowl.

Referring to the dispenser cabinet 24, the pedestal 27 acts as a hopper for food rewards for the pets and this hopper has an access door 41. The rewards are dispensed to an eating shelf 42 where the pet can reach them with its mouth. The entire device is actuated by a paw control lever 43 which moves vertically into a slot 44 in the dispenser cabinet 24. In using the device of FIGS. 1 and 2, the pet steps on the step 26 to reach the tray surface 37, whereupon he eliminates on the tray. When he finishes, he steps to the floor and operates with his paw the vertically movable control 43. If the pet has urinated or eliminated solids, the mechanism will operate to dispense a food reward into the eating shelf 42.

Figure 3:
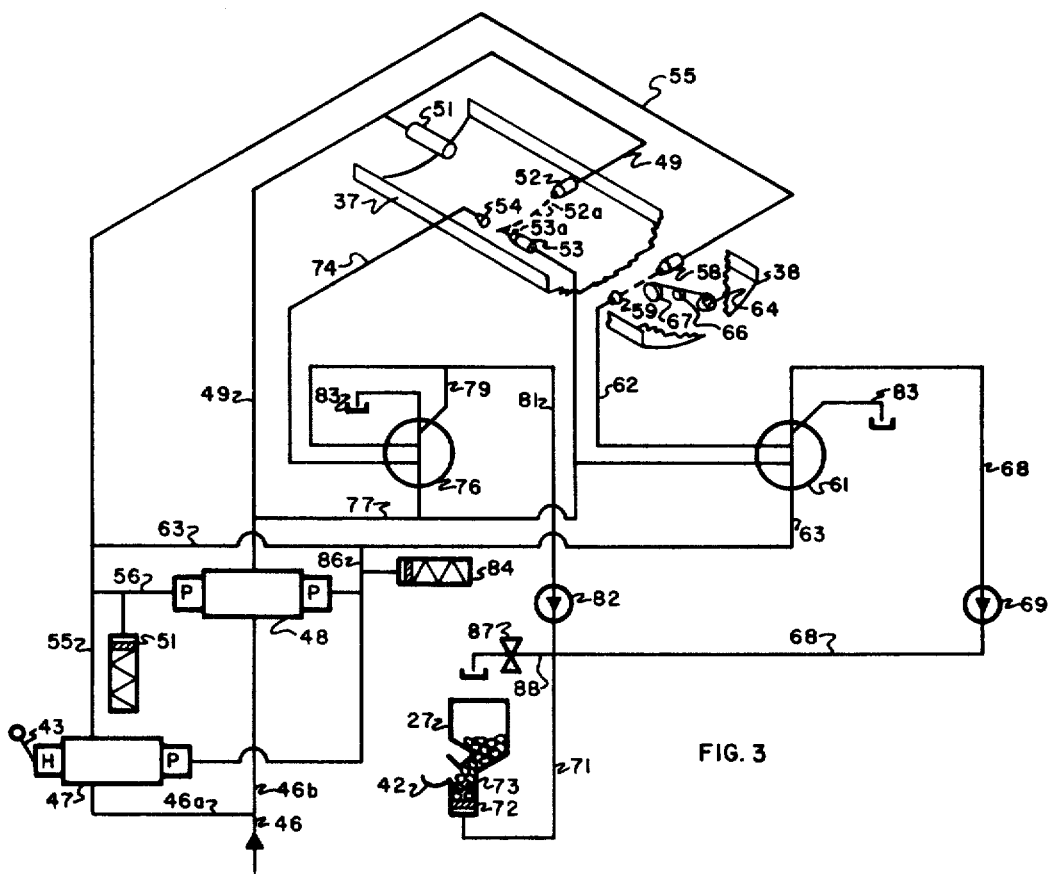
FIG. 3 is a schematic diagram of the hydraulic circuits and associated urine sensor and feces sensor of the device of FIGS. 1 and 2, and showing the mode in which the dispenser is operated after actuation of the paw valve.

Referring to FIG. 3, there is illustrated a presently preferred type of hydraulic circuit for operating the mechanisms previously described in FIGS. 1 and 2. A connection is made to the household water supply and this flows through a branched pipe 46, one branch 46a supplying water to a normally closed paw valve 47 and the other branch 46b delivering water to a normally closed flush valve 48. When the flush valve 48 is opened, water flows through a conduit or pipe 49 to a flushing outlet 51, which flows water over the tray surface 37 and flushes any feces past the feces detector having a pair of nozzles 52 and 53 and a single receptor 54. When the pet finishes eliminating, he operates the paw lever 43 to obtain his reward, and this opens the paw valve 47, allowing water to flow into the pipe 55 to a branch 56 delivering this water under pressure to a power motor P on the valve 48, causing that valve to open. In order to give the urine detector time in which to operate before flush water flows into it, a delay mechanism 57 is connected to the branch 56 to delay by 10 or 15 seconds the operation of the flushing valve 48.

The pipe 55 from the paw valve 47 delivers water also to a urine detecting nozzle 58 which shoots water to a receptor 59 connected to a fluidic switch 61 by a pipe 62. The pipe 55 has a second branch 63 which supplies water under pressure to the inlet of the fluidic switch 61.

When the pet sits on the tray surface 37 and urinates, the liquid flows to the right off of the end 38 of the tray and into a cup 64 which is pivoted at 66 and when full rotates clockwise in FIG. 3 so that an interceptor plate 67 intercepts the flow of water from the nozzle 58 to the receptor 59. This causes a lack of signal in the pipe 62 which causes the flow of water through the fluidic switch 61 to flow straight ahead and into an output conduit 68 which flows through a check valve 69 to a pipe 71 connected to the bottom end of the dispenser 27, where it lifts a piston 72 to eject a unit of food 73 to the food shelf 42.

Considering now the feces sensor, the feces are deposited by the animal to the left of the nozzle 52 and when the flushing flow from outlet 51 begins, it will wash the feces to the right to the end 38 of the tray and into the toilet bowl 20, as shown in FIGS. 1 and 2. During this flushing, water flows from the nozzle 52 in a stream 52a across the path that feces will take when flushed into the toilet. In the absence of a feces in the path of the stream 52a, this stream will intercept a stream of water 53a from the nozzle 53 and will deflect that stream as shown. In the absence of deflection, the stream 53a will shoot into the receptor 54 and pass water down a pipe 74 to a fluidic switch 76. The fluidic switch 76 receives water flow from a branch pipe 77 from the main flushing conduit 49 and this same branch 77 supplies water to the nozzle 53. Another branch 78 supplies a signal to the urine sensor fluidic switch 61 to render that switch inoperative when flushing flow commences so that the fluidic switch 61 will not respond to a false signal. If the sensing stream 52a is intercepted by a feces being flushed across it, the signal on pipe 74 will act on the fluidic switch 76 to deflect the main supply stream to the angular branch 79 which has a closed circuit back to the fluidic switch to continue the deflection so that momentary interruption by a moving feces will continue the signal. This signal in pipe 79 will be transmitted to a branch pipe 81 passing through a check valve 82 to the dispenser pipe 71.

The fluidic switches 61 and 76 are well known in industry and are described in various publications, including *Science News*, Volume 91, page 70, dated 21 Jan., 1967. They operate by deflecting a sizable flow from a normal path into a path that responds to the signal. For example, the fluidic switch 76 has a current flow from below that normally flows straight ahead and into a drain 83, indicated symbolically, but which, of course, would drain into the toilet bowl 20 of FIGS. 1 and 2. If, however, a signal is received on pipe 74, this stream will be deflected into the branch pipe 79 and will then transmit force through the pipe 81 to actuate the dispenser 27. Similarly, the fluidic switch 61 will normally send fluid flow vertically upwardly as shown in FIG. 3, unless a signal is received from the receptor 59. This signal is received only when there is no urine in the cup 64 and, under these conditions, the flow through the switch 61 is deflected to the branch 83 to drain. However, if there is urine in the cup 64, it will be pivoted to the point where the interceptor plate 67 interrupts this stream, and there will be no signal on the fluidic switch 61, whereupon the water will flow vertically upwardly through the fluidic switch 61 to the pipe 68, causing operation of the dispenser 27. As mentioned previously, during a flushing flow, a signal passes through the pipe 78 to deflect the flow to the drain pipe 83 to render that fluidic switch inoperative during flushing. Considering now the turning off of the paw valve 47 and the flush valve 48, there is provided a time delay circuit for automatically closing these valves after a suitable flushing time period has elapsed. This time delay is controlled in any suitable fashion; for example, by a schematic time delay device 84 positioned in a branch conduit 86 from the branch 63 and after the time period has elapsed, this will permit a pressure flow to the right end of each of valves 47 and 48. This pressure flow will shut off both of these valves, restoring the entire system to a starting position. The trapped fluid in the dispenser 27, after it is actuated, will slowly bleed to drain through a restriction 87 in a branch conduit 88.

MODIFICATION OF FIG. 4

Figure 4:
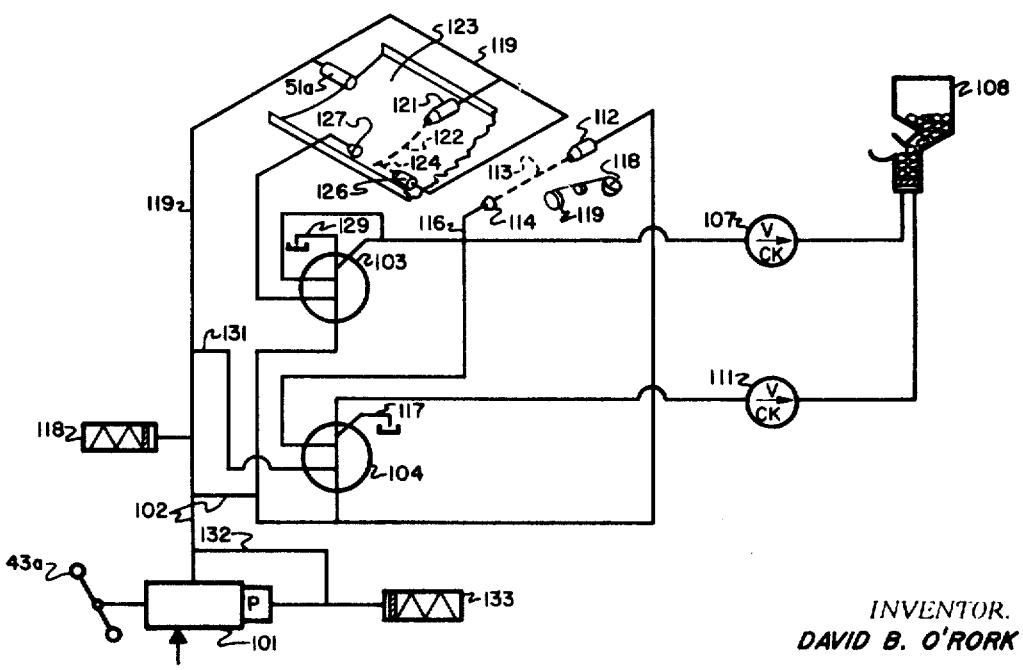
FIG. 4 is a modified version of the schematic circuit of FIG. 3, wherein one valve is used instead of two valves, as in FIG. 3.

Referring to FIG. 4, there is illustrated a modified form of the circuit of FIG. 3 which carries out most of the functions of the circuit of FIG. 3, but with a fewer number of parts. Water from a source is supplied to a normally closed valve 101 which is operated by a paw lever 43a by the foot power of a pet. When opened, the valve passes water through a conduit 102 which has a branch 102a leading to a feces fluidic switch 103 and a branch 102b leading to a urine fluidic switch 104. The output of fluidic switch 103 passes through a pipe 106 and check valve 107 to a reward dispenser 108. The output of the urine fluidic switch 104 passes through a pipe 109 and through a check valve 111 to the reward dispenser 108. It will be seen, therefore, that both of the fluidic switches are in series with the pet operated control 43a and the reward dispenser 108. As to each other, however, the fluidic switches 103 and 104 are in parallel.

Referring now to the urine sensor of FIG. 4, the pipe 102b passes to a nozzle 112 which shoots a stream of water 113 into a receptor 114 connected to a pipe 116 leading to the urine fluidic switch 104. When the stream of water 113 is received by the receptor 114, the fluidic switch has a signal and its output is discharged to drain through a conduit 117. When a urine cup 118 is filled, it pivots an interceptor plate 119 in the path of the stream 113, causing a lack of signal on the fluidic switch 104 which then directs its stream into the conduit 109 to operate the dispenser 108.

Referring now to the feces sensor of FIG. 4, the flushing flow is delayed by a time delay device and thereupon passes through a flushing conduit 119 to a flushing outlet 51a. The conduit 119 continues on to a nozzle 121 which directs a stream of water 122 across a tray 123 to impinge upon a stream of water 124 from a nozzle 126 supplied also by the conduit 119. If the stream 122 is intercepted by feces, stream 124 then shoots into a receptor 127, sending a signal through a pipe 128 to the fluidic switch 103, and the stream of this switch is deflected to the right into conduit 106 and a branch conduit 129 leads back to the fluidic switch to continue the deflection of the stream, even though the signal from pipe 128 is momentary. When the time delay device 118 allows flushing flow to commence, a branch pipe 131 places a signal on the urine fluidic switch 104 to render that switch inoperative so that it will not falsely react to flushing flow. The valve 103 may be turned off by water power from a branch conduit 132 controlled by a time delay device 133.

DETAILED DESCRIPTION

Figure 5:
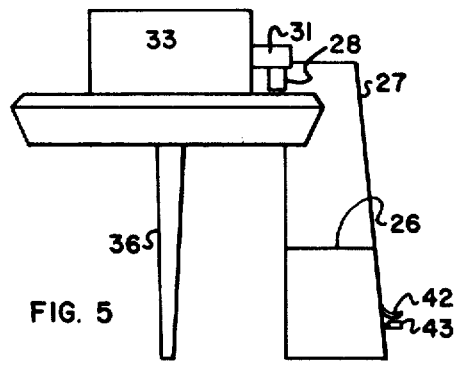
FIG. 5 is a front view of the pet toilet of FIG. 1.
Figure 7:
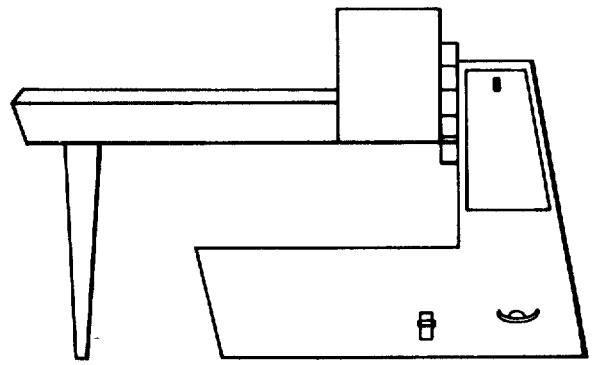
FIG. 7 is a side view of the pet toilet of FIG. 1.
Figure 6:
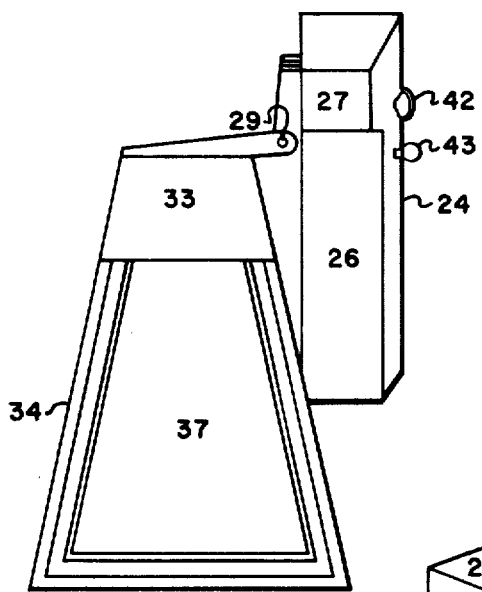
FIG. 6 is a top view of the pet toilet of FIGS. 1 and 5.
Figure 9:
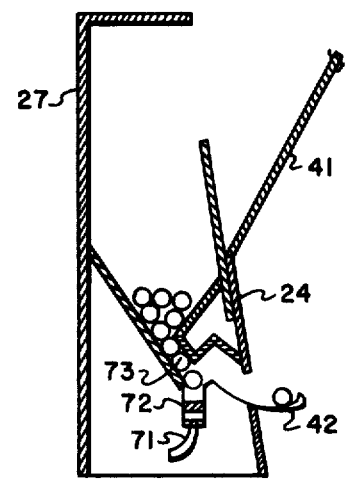
FIG. 9 is a sectional view along the line IX—IX of FIG. 8.
Figure 8:
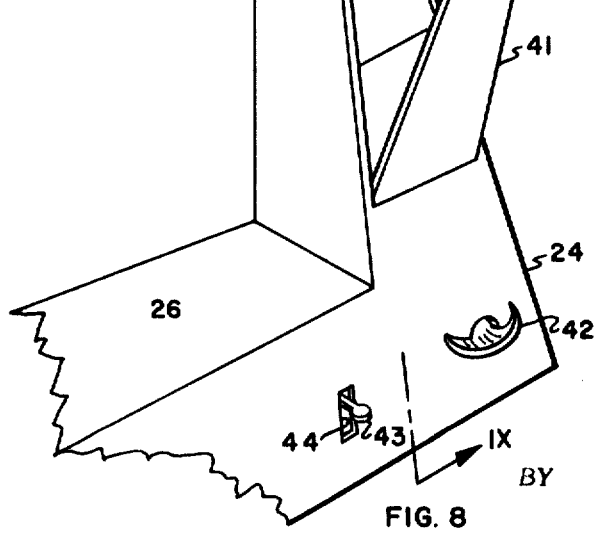
FIG. 8 is a three-dimensional view of a portion of the dispenser cabinet, showing the filler door open for adding rewards to the cabinet.

The various mechanisms described in FIGS. 1, 2 and 3 are shown in greater detail in FIG. 5 and the remaining figures. The mechanical outline of the parts is illustrated in FIGS. 5 through 8, and there is shown the various parts and different views for a clearer explanation. In FIG. 9, there is illustrated the hydraulic conduit 71 to the bottom of the dispenser 24 together with the piston 72, which acts on one of the food rewards 73 to push it onto the feeding shelf 42.

In FIG. 10, there is illustrated that portion of the water system located in the tray cabinet 33 as well as the parts of the urine sensor and the feces sensor. There it will be noted that the flush conduit 49 is much larger in size than the other conduits. All conduits are preferably of flexible plastic, especially those at the region of the hinge joint between the pedestal and the tray cabinet 33. It will be noted that the urine cup 64 is mounted on the rotatable shaft 66 journaled in the side rails 39 of the tray 34. Also mounted on this shaft are a pair of baffles 134, the function of which is to dump the urine cup 64 when flush water strikes these baffles. This action is illustrated in detail in FIG. 15. Referring still to FIG. 10, it will be noted that the feces detector nozzle 52 is located on the far rail 39 and the nozzle 53 on the near rail. The fluidic switches 61 and 76 are also mounted in this cabinet so that their conduits to drain will drop into the toilet bowl 20 of FIG. 1.

Figure 11:
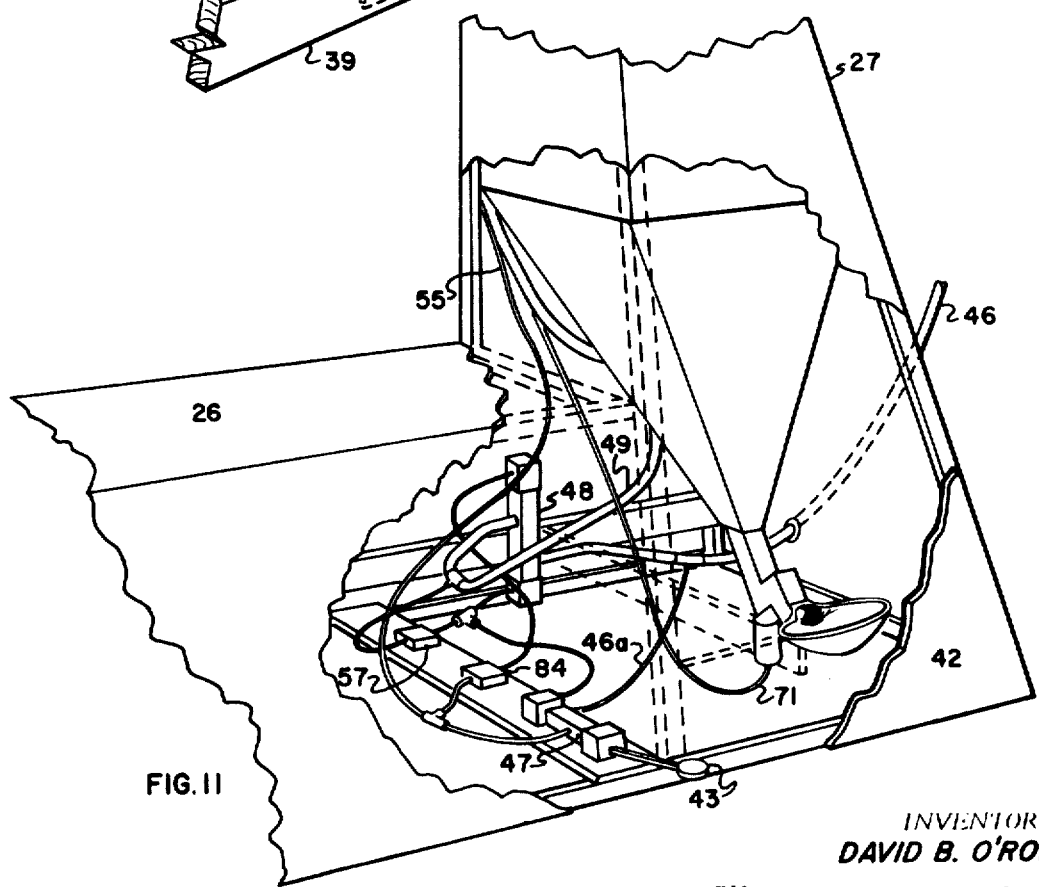
FIG. 11 is a three-dimensional view with portions broken away of the mechanisms disposed in the bottom part of the dispenser cabinet.

Referring now to FIG. 11, it will be noted that the paw lever 43 is connected to the paw valve 47 and that this, in turn, controls the flush valve 48 to which is connected the large size inlet conduit 46. The outlet conduit 49 from the flush valve 48 passes through the back of the pedestal 27 to align itself with the hinge joint between the pedestal and the tray mechanism.

Referring to FIG. 12, there is illustrated the feces detector and nozzles 52 and 53 and the direction of the flow of flushing water is indicated by the arrow 136 and a feces being moved in the arrow by the flush water is identified as 137. When the feces 137 intercepts the stream of water 52a the stream from nozzle 53 will no longer be deflected and will enter the receptor 54 to give a signal to the associated fluidic switch 76 (FIG. 3). These same parts are shown in FIG. 13, but with the addition of permanent baffles 138 to protect the nozzles and the receptor from interference by a flushing flow.

Referring to FIG. 14, there is illustrated the same parts also as in FIGS. 12 and 13, including the nozzle 52, the nozzle 53 and the tray surface 37.

Referring to FIGS. 15 and 16, there is illustrated the mechanism for dumping the urine cup 67. As will be noted in FIG. 16, when the urine cup 64 is filled, the baffles 134 mounted on the rotary pivot rod 66 are at the level of the tray surface 37. When flush water runs down this tray surface, it strikes these baffles 134, causing the rod 66 to rotate, as shown best in FIG. 15C. This extreme rotation illustrated there causes all the urine to flow out of the cup 64 and when the flushing flow ceases, the cup and the baffles will be restored to their ready position to sense a new flow, as shown in FIG. 15A. Also shown in FIG. 15 is the relationship between the interceptor plate 67 and the jet nozzle 58. In FIG. 15A, which is the ready position with no liquid in the cup 64, the jet from the nozzle 58 flows freely across the top of plate 67. In FIG. 15B, the position when the cup 64 has a substantial quantity of urine in it, the plate 67 is rotated to intercept the jet from nozzle 58. In FIG. 15C, the nozzle 58 may deliver a jet across the intervening space, but this is immaterial, as after the cessation of the flushing flow 136 the entire system is inactivated and the cup position returns to normal as in FIG. 15A.

CIRCUITS AND INTERLOCKS

Referring to FIG. 3, it will be noted that the reward dispenser 27 is connected to the paw lever 43 through two separate circuits. One circuit includes the urine sensor fluidic valve 61 and the other feces sensor fluidic valve 76.

Referring now to the first circuit, this includes the valve 47, the pipe 55, the branch pipe 63, the fluidic valve 61, the valve output pipe 68 and the dispenser pipe 71. This direct circuit can be rendered inoperable by a signal delivered at the valve 61 by the pipe 62 or by the pipe 78. The pipe 62 is part of an interlock or an interlock circuit that prevents the dispenser from operating unless the urine sensor 58–59 detects the presence of urine.

The other circuit from paw lever 43 to dispenser 27 includes the valve 47, the pipe 55, the branch 56 to valve 48, the valve 48, the pipe 49, the branch 77 to fluidic valve 76, the fluidic valve 76, the valve output pipe 78–81 and the dispenser pipe 71. The pipe 74 to the fluidic valve 76 is part of an interlock or an interlock circuit that prevents the dispenser from operating unless the feces sensor 52–53–54 senses the presence of feces.

Referring to FIG. 4, the connection from paw lever 43a to dispenser 108 is also through two paths, although one path is sufficient if a single response is obtained from a combination feces and urine sensor that senses excrement of any type. The first path is through the valve 101, pipe 102, pipe 102a to fluidic valve 104, and through output pipe 109 to dispenser 108. The other path is through valve 101, pipe 102, pipe 102b, fluidic valve 103, output pipe 106 and check valve 107 to dispenser 108. The pipe 128 from feces sensor 121–126–127 is an interlock, or part of an interlock circuit that prevents operation of this second path unless the presence of feces is detected. The pipe 116 to fluidic valve 104 is an interlock or part of an interlock circuit preventing operation of the dispenser unless the presence of urine is detected. The interlock could, of course, be mechanical or electrical and the fluidic valves could be mechanical or electrical.

OPERATION

The operation of the mechanism and the system has already been explained with reference to FIG. 3. A modified form of operation has been explained with reference to FIG. 4.

It will be apparent to those skilled in the art that various mechanisms and circuits may be employed to carry out the functions herein described. In accordance with the rules presently in force, I have endeavored to describe the presently preferred embodiments of my invention and at present I believe that a hydraulic circuit or fluidic circuit, as shown, is a preferable mechanism. Various types of sensors, however, can be employed, such as electrodes in the tray which could sense by conductivity or other measurement the presence of urine. Also, the presence of feces can be sensed in various mechanical, chemical, optical or electronic fashions, as by use of weight, change in capacitance between plates, photoelectric cells or sampling resultant odors and gases. The described mechanism, however, is free from hazards and is effective and utilizes a power source available at all flush toilets, namely water under pressure.

Also, the function of the fluidic valves could be served by appropriate electron tubes, semiconductors or any other type of control mechanism responsive to a signal. The unit 24 forming the step 26 and the dispenser 27 could be placed on the other side of the toilet bowl to accommodate bathroom geometry.

It will be appreciated by those skilled in the art that various backup pressures and flow characteristics can be obtained by using conduits of different dimensions. Also, special restrictors can be placed in any conduit wherein a small flow is desired for control purposes. Various types of time delay mechanisms, of course, are available, including clock mechanisms, both electrical and mechanical. For this reason the appended claims are not limited to the disclosure illustrated, but include all variations and modifications that fall within the true spirit and scope of the invention.

I claim:

1. A pet-operated toilet for a household toilet bowl having a household water supply, which operates to flush excrement of the pets into the toilet bowl, comprising:
   a. a tray mounted above the bowl upon which the pet excretes and having one end over the bowl which is lower than the other end so that liquid will flow into the toilet bowl;
   b. a water system for the tray adapted to be connected to the household water supply and having a flushing outlet;
   c. a normally closed pet-operated control in the water system controlling flow to the flushing outlet;
   d. a reward dispenser connected to the pet-operated control for operation when the control is operated;
   e. a liquid sensor on said tray for detecting the presence of urine on the tray;
   f. a solid sensor on the tray for detecting the presence of feces on the tray;
   g. and an interlock circuit connecting the two sensors to the reward dispenser to prevent operation of the dispenser unless at least one sensor detects the presence of excrement.

2. A pet-operated toilet as set forth in claim 1, wherein the sensors are water powered by the water system.

3. A pet-operated toilet as set forth in claim 1, wherein the urine sensor includes a cup that collects urine and the cup moves in response to the weight of urine and the movement of the cup is sensed by the urine sensor.

4. A pet-operated toilet as set forth in claim 1, wherein the flush water moves the feces in a selected direction and the feces sensor detects in a path transverse to this direction, and the feces sensor detects the movement of feces across the detection path.

5. A pet-operated toilet as set forth in claim 1, wherein the flush water moves feces in a selected direction, and the feces sensor includes a nozzle on the water system shooting a stream of water transverse to this direction, and feces are sensed when they move to interrupt this water stream.

6. A pet-operated toilet as set forth in claim 2, wherein the sensors include streams of water and the excrement is caused to intercept at least one stream and the interception acts on fluidic switches to operate the dispenser.

7. A pet-operated toilet as set forth in claim 2, wherein a time delay mechanism delays the flushing flow to give time enough for the urine sensor to operate.

8. A pet-operated toilet as set forth in claim 1, wherein the flushing control is returned to a normal condition by water power controlled by a time delay mechanism.

9. A pet toilet comprising:
   a. a tray upon which the pet excretes;
   b. a reward dispenser;
   c. a pet-operated control for the dispenser;
   d. an excrement sensor on the tray;
   e. and an interlock circuit connecting the sensor to the dispenser to prevent operation of the dispenser in the event no excrement is sensed.

10. A pet toilet as set forth in claim 9, wherein the excrement sensor has a urine sensor and a feces sensor and the interlock circuit prevents operation of the dispenser unless at least one sensor detects the presence of excrement on the tray.

11. A pet toilet as set forth in claim 9, wherein the sensor is in series between the control and the dispenser and actuation of the dispenser occurs when the sensor detects the presence of excrement.

12. A pet toilet for use with a source of water under pressure comprising:
   a. a tray upon which the pet excretes;
   b. a water system for the tray having a flushing outlet on the tray and connectable to the water source;
   c. a normally closed pet-operated valve in the water system controlling flow to the flushing outlet;
   d. a reward dispenser connected to the flushing valve for activation when the valve is activated;
   e. a urine sensor on the tray;
   f. a feces sensor on the tray;
   g. and an interlock connecting the two sensors to the reward dispenser to prevent operation of the dispenser unless at least one sensor detects the presence of excrement.